(12) United States Patent
Narikawa

(10) Patent No.: US 8,002,413 B2
(45) Date of Patent: Aug. 23, 2011

(54) LIGHT SOURCE UNIT AND PROJECTOR

(75) Inventor: Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 301 days.

(21) Appl. No.: 12/427,849

(22) Filed: Apr. 22, 2009

(65) Prior Publication Data

US 2009/0268167 A1 Oct. 29, 2009

(30) Foreign Application Priority Data

Apr. 25, 2008 (JP) ................................. 2008-114827

(51) Int. Cl.
*G03B 21/26* (2006.01)
(52) U.S. Cl. .................... 353/37; 353/1; 353/2; 353/31; 353/38; 353/81; 353/82; 353/83; 353/50; 353/51; 353/39; 353/48; 353/85; 353/86; 353/87; 353/94; 353/98; 353/99; 353/122; 348/771; 348/774; 348/804; 348/806; 359/567; 359/616; 359/617; 359/558; 359/559; 359/615; 359/5; 359/6; 359/7; 359/8; 359/9; 359/618; 359/619; 359/620; 359/621; 359/622; 359/623; 359/624; 359/625; 359/626; 313/483; 313/484; 313/485; 313/486; 362/327; 362/545; 362/555; 362/612; 362/800; 372/39; 372/69; 372/70; 372/92; 372/99

(58) Field of Classification Search .................. 353/1, 2, 353/31, 37, 38, 81–83, 122, 50, 51, 121, 353/39, 48, 85–87, 94, 98, 99; 359/5, 6, 359/7, 8, 9, 618–640, 567, 616, 617, 558, 359/559, 615; 362/327, 545, 555, 612, 800, 362/627, 606, 607, 618; 348/771, 774, 804, 348/806, 742, 743; 313/483, 484, 485, 486
See application file for complete search history.

(56) References Cited

U.S. PATENT DOCUMENTS 6,517,211 B2 * 2/2003 Mihara ........................... 353/98
7,494,228 B2 * 2/2009 Harbers et al. ................... 353/94
(Continued)

FOREIGN PATENT DOCUMENTS

JP 2004-327361 A 11/2004
(Continued)

OTHER PUBLICATIONS

Japanese Office Action dated Apr. 22, 2010, and English translation thereof issued in counterpart Japanese Application No. 2008-114827.

*Primary Examiner* — Georgia Y Epps
*Assistant Examiner* — Sultan Chowdhury
(74) *Attorney, Agent, or Firm* — Holtz, Holtz, Goodman & Chick PC

(57) ABSTRACT

There is provided a light source unit which includes a luminescent light source which receives excitation light so as to emit light of a predetermined wavelength band, excitation light sources which shine excitation light on to the luminescent light source, a reflection space having the luminescent light source in an interior thereof and an emission space which emits luminescent light source light emitted from the reflection space from an emission port whose area is made smaller than the area of the luminescent light source and a projector which employs the light source unit.

12 Claims, 7 Drawing Sheets

U.S. PATENT DOCUMENTS

| | | | |
|---|---|---|---|
| 2001/0019240 A1* | 9/2001 | Takahashi | 313/483 |
| 2008/0151196 A1* | 6/2008 | Kinoshita | 353/69 |

FOREIGN PATENT DOCUMENTS

| | | |
|---|---|---|
| JP | 2005-274836 A | 10/2005 |
| JP | 2006-208894 A | 8/2006 |
| JP | 2006-332042 A | 12/2006 |
| JP | 2007-300138 A | 11/2007 |

* cited by examiner

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2008-114827 filed on Apr. 25, 2008, the entire disclosure of which, including the description, claims, drawings, and abstract, is incorporated herein by reference in its entirety.

BACKGROUND OF THE INVENTION

1. Field of the Invention

The present invention relates to a light source unit which employs light emitting diodes or solid state light emitting devices and a projector which includes the light source unit.

2. Description of the Related Art

In these days, data projectors are used in many cases as an image projection apparatus for projecting screens and video images of a personal computer and, further, images based on image data stored in a memory card on to a screen. In projectors of this type, light emitted from a light source is concentrated on to a micromirror display device referred to as a DMD or a liquid crystal panel so as to display a color image on toga screen.

In these projectors, conventionally, projectors employing highly bright discharge lamps as light sources have been the mainstream of projectors. In recent years, however, there have been developments in projectors employing, as light sources, red, green and blue light emitting diodes or solid-state light emitting devices such as organic electroluminescence light emitting devices, and there have been made many proposals.

Compared with discharge lamps, light emitting diodes are advantageous in that they consume less power and highly reliable. However, the amount of light emitted by a single light emitting diode is still not good enough for use as a light source for a projector, resulting in a problem that a desired luminance cannot be obtained. Then, in order for light emitting diodes to be used as a light source of a projector, there exists a case where a plurality of light emitting diodes are disposed, so that lights from the plurality of light emitting diodes so disposed are combined for use.

For example, Japanese Unexamined Patent Publication No. 2005-274836 proposes a light source unit in which a plurality of white light emitting diodes are installed adjacent to one another on a substantially ellipsoidal or paraboloidal base member and are arranged so that their focal points are situated in the vicinity of a light incident surface of a light guiding or smoothing unit.

In addition, Japanese Unexamined Patent Publication No. 2006-208894 proposes a light source unit in which three light sources in each of which a plurality of light emitting diodes are arranged in an array are disposed on three sides of a cross dichroic mirror, and a rod integrator having a vertically elongated truncated quadrangular pyramid shape is disposed on an optical axis of a beam of light emitted from the cross dichroic mirrors so as to combine light emitted from the plurality of bright points.

In an optical system of an image display device or the like, a spatial expanse in which radiant flux which is handled effectively exists can be expressed by area and solid angle, and a product thereof is referred to as Etendue. The Etendue is a value preserved in the optical system.

In the projector which employs the display device such as the DMD described above, assuming that the area of an illuminated region of the display device is S' and the solid angle of incident light which can be taken in by the area S' of the illuminated region is $\Omega'$, the Etendue of the display device is expressed by $S' \times \Omega'$. In addition, assuming that the area of a light emitting region of the light source unit is S and the solid angle of emitted light is $\Omega$, the Etendue of the light source unit is expressed by $S \times \Omega$.

Since Etendue is the value preserved in the optical system, when the value of the Etendue of the light source unit which is expressed by $S \times \Omega$ is smaller than the value of the Etendue of the display device which is expressed by $S' \times \Omega'$, all the light emitted from the light source unit can be used, and hence, all the emitted light becomes effective light. However, when the value of the Etendue of the light source unit which is expressed by $S \times \Omega$ is larger than the value of the Etendue of the display device which is expressed by $S' \times \Omega'$, there occurs a situation in which some of the light emitted form the light source unit cannot be used.

In the related-art projectors which employ light emitting diodes, since the amount of light emitted from a light emitting diode is small, a plurality of light emitting diodes need to be provided in such a manner that beams of light emitted from the plurality of light emitting diodes are collected for use. In the event that the plurality of diodes are used, however, since the light emitting area becomes wide and hence, the value of the Etendue of the light source unit becomes larger than the value of the Etendue of the light display device, the amount of light that cannot be used is increased, and hence, there has been caused a problem that the utilization efficiency of the light emitting diodes is reduced.

In addition, in light emitting diodes, the light emitting efficiency of a green light emitting diode is lower than those of a red light emitting diode and a blue light emitting diode, a larger number of green light emitting diodes need to be provided than red light emitting diodes and blue light emitting diodes. In this case, even though light emitting diodes are collected together densely, the area of light emitting areas increases as the number of light emitting diodes provided increases, and therefore, since the value of Etendue of green light emitting diodes is increased, the ratio of effective light is decreased, and after all, there has still existed a problem that the issue of insufficient quantity of usable light from the green light emitting diodes remains unsolved.

SUMMARY OF THE INVENTION

The invention has been made in view of the problems inherent in the related-art and an object thereof is to provide a light source unit which has a high utilization efficiency of light emitting diodes and can easily increase the quantity of light when light emitting diodes or solid-state light emitting devices are used as light sources and a projector which can project a projection image of higher luminance by the use of the light source unit.

According to a preferred aspect of the invention, there is provided a light source unit comprising a luminescent light source which emits light of a predetermined wavelength band by receiving excitation light, an excitation light source which shines excitation light to the luminescent light source, a reflection space having the luminescent light source in an interior thereof, and an emission space which emits the light of the luminescent light source that is emitted from the reflection space from an emission port whose area is made smaller than the area of the luminescent light source.

In addition, the excitation light source is a surface illuminant in which a plurality of light emitting diodes or solid state light emitting devices are arranged on a flat surface.

It should be noted that the excitation light source may take the form of a surface illuminant which employs a board-shaped light emitting diode or a board-shaped solid state light emitting device.

In addition, the light source unit includes two excitation light sources like the excitation light source, and the two excitation light sources are disposed parallel in such a manner as to face each other.

Further, the luminescent light source is disposed in an intermediate position between the excitation light sources which are disposed to face each other in such a manner as to become parallel to the excitation light sources.

In addition, the reflection space is formed into a hollow rectangular parallelepiped shape which is surrounded by planes including the two excitation light sources, a plurality of reflection mirrors and an emission dichroic mirror which reflects light emitted from the excitation light sources but transmits light emitted from the luminescent light source.

Additionally, the emission space is formed into a hollow rectangular parallelepiped shape which is surrounded by planes including the emission dichroic mirror, reflection mirrors and a predetermined opening which is referred to as the emission port.

Further, the emission port of the emission space is formed in such a manner as to become parallel to the luminescent light source.

In addition, a reflection dichroic mirror which transmits excitation light emitted from the excitation light sources but reflects luminescent light source light of a predetermined wavelength band which is emitted from the luminescent light source is disposed between the excitation light source and the luminescent light source.

Additionally, the light source unit includes a red light source device which emits red light, a green light source which emits green light and a blue light source device which emits blue light, and at least one of the red light source device, the green light source device and the blue light source device includes the excitation light sources and the luminescent light source.

Further, the green light source device includes the excitation light sources and the luminescent light source.

In addition, a projector of the invention includes the light source unit, a light smoothing unit, a display device, a projection side optical system and a projector control unit.

BRIEF DESCRIPTION OF THE DRAWINGS

Although the invention will be understood from the following detailed description and accompanying drawings, the description and drawings are mainly for the purposes of describing the invention, and hence, the scope of the invention is not limited at all thereby.

In these situations.

DETAILED DESCRIPTION OF THE PREFERRED EMBODIMENT

Figure 1:
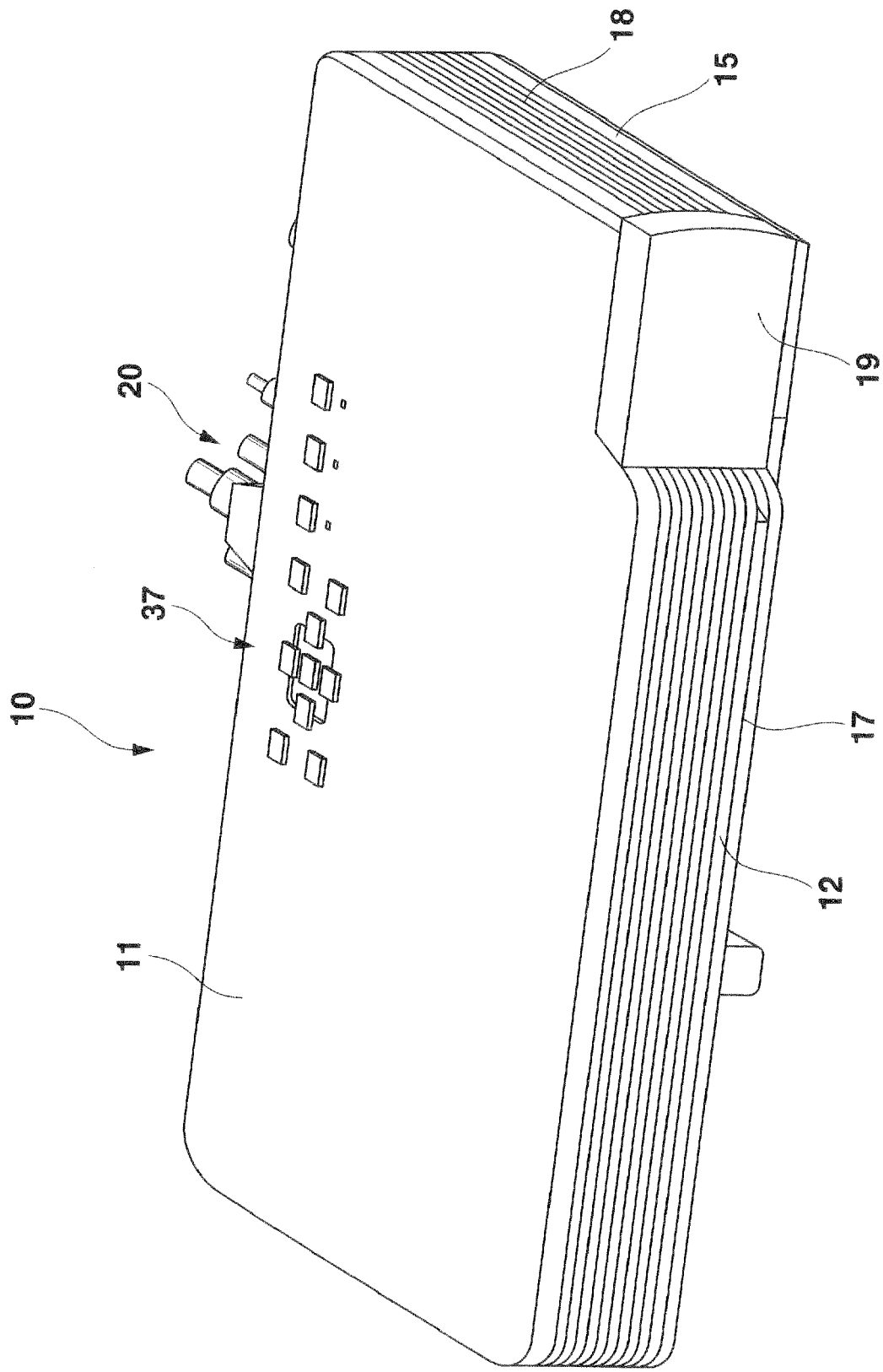
FIG. 1 is a perspective view showing an external appearance of a projector according to an embodiment of the invention.

Hereinafter, a preferred embodiment for carrying out the invention will be described by the use of the accompanying drawings. However, although various preferred technical limitations for carrying out the invention are given to the embodiment which will be described below, it should be noted that the scope of the invention is not limited to the following embodiment that will be described in detail below and depicted in the accompanying drawings.

A projector 10 according to a best mode for carrying out the invention includes a light source unit 63, a light guiding unit or light smoothing unit 75, a display device 51, a projection side optical system 90, and a projector control unit.

In addition, the light source unit 63 includes a red light source device 151R which employs red light emitting diodes 161R, a green light source device 151G which emits green light and a blue light source device 151B which employs blue light emitting diodes 161B. The green light source device 151G includes a rectangular flat board-like luminescent light source 152 which receives excitation light to thereby emit green light, an excitation light source 153 which is referred to as a surface illuminant which shines excitation light to both front and rear surfaces of the luminescent light source 152, a reflection space 170 which includes at least two sides which are made up of the excitation light source 153 and has the luminescent light source 152 in an interior thereof, and an emission space 171 which emits luminescent light source light of a predetermined wavelength band which is emitted from the reflection space 170 from an emission port 173 whose area is made smaller than the area of the luminescent light source 152.

The excitation light source 153 is made into an excitation light source 153 which is a surface illuminant in which a plurality of ultraviolet light emitting diodes 161UV are arranged on a flat surface.

In addition, this green light source device 151G includes two excitation light sources 153 which are disposed parallel to face each other, and the luminescent light source 152 is disposed in an intermediate position between the two excitation light sources 153 in such a manner as to become parallel to the excitation light sources 153. Additionally, the reflection space 170 is formed into a hollow rectangular parallelepiped shape which is surrounded by planes including the two excitation light sources 153, a plurality of reflection mirrors 155, and an emission dichroic mirror 156 which reflects light emitted from the excitation light sources 153 but transmits light from the luminescent light source 152.

Further, the emission space 171 is formed into a hollow rectangular parallelepiped shape which is surrounded by planes including the emission dichroic mirror 156, a plurality of reflection mirrors 157, and a predetermined opening which is referred to as the emission port 173. This emission port 173 is formed in such a manner as to become parallel to the luminescent light source 152.

In addition, a reflection dichroic mirror 154 is disposed between the excitation light source 153 and the luminescent light source 152 which reflection dichroic mirror 154 transmits light emitted from the excitation light source 153 but reflects green light emitted from the luminescent light source 152.

Hereinafter, the embodiment of the invention will be described based on the drawings. As is shown in FIG. 1, a projector 10 according to the embodiment of the invention has a substantially rectangular parallelepiped shape, and the projector 10 has a lens cover 19 which is provided to a side of a front panel 12 which is a front side lateral panel of a body casing of the projector 10 for covering a projection opening, a plurality of air outlet slots 17 being provided in the front panel 12. Further, although not shown in the drawing, the projector 10 includes an Ir reception part which receives a control signal from a remote controller.

In addition, the projector 10 has a key/indicator part 37 which is provided on an upper panel 11 of the body casing. This key/indicator part 37 includes keys and indicators including such as a power supply switch key, a power indicator which informs that the power supply is on or off, a projection switch key which switches on and off the projection, and an overheat indicator which informs of overheat of the light source unit, a display device or a control circuit when they are actually overheated.

Further, when looking at a back side of the body casing, the projector 10 has on a back panel thereof an input/output connector part where a USB terminal, an image signal inputting D-SUB terminal, an S terminal, an RCA terminal and the like are provided and various terminals 20 including a power supply adapter plug and the like.

In addition, the projector 10 has a plurality of air inlet slots 18 which are provided in the vicinity of a lower portion of each of a right-hand panel 14, not shown in FIG. 1, which configures a lateral side panel of the body casing and a left-hand panel 15 which is a lateral side panel of the body casing shown in FIG. 1.

Figure 2:
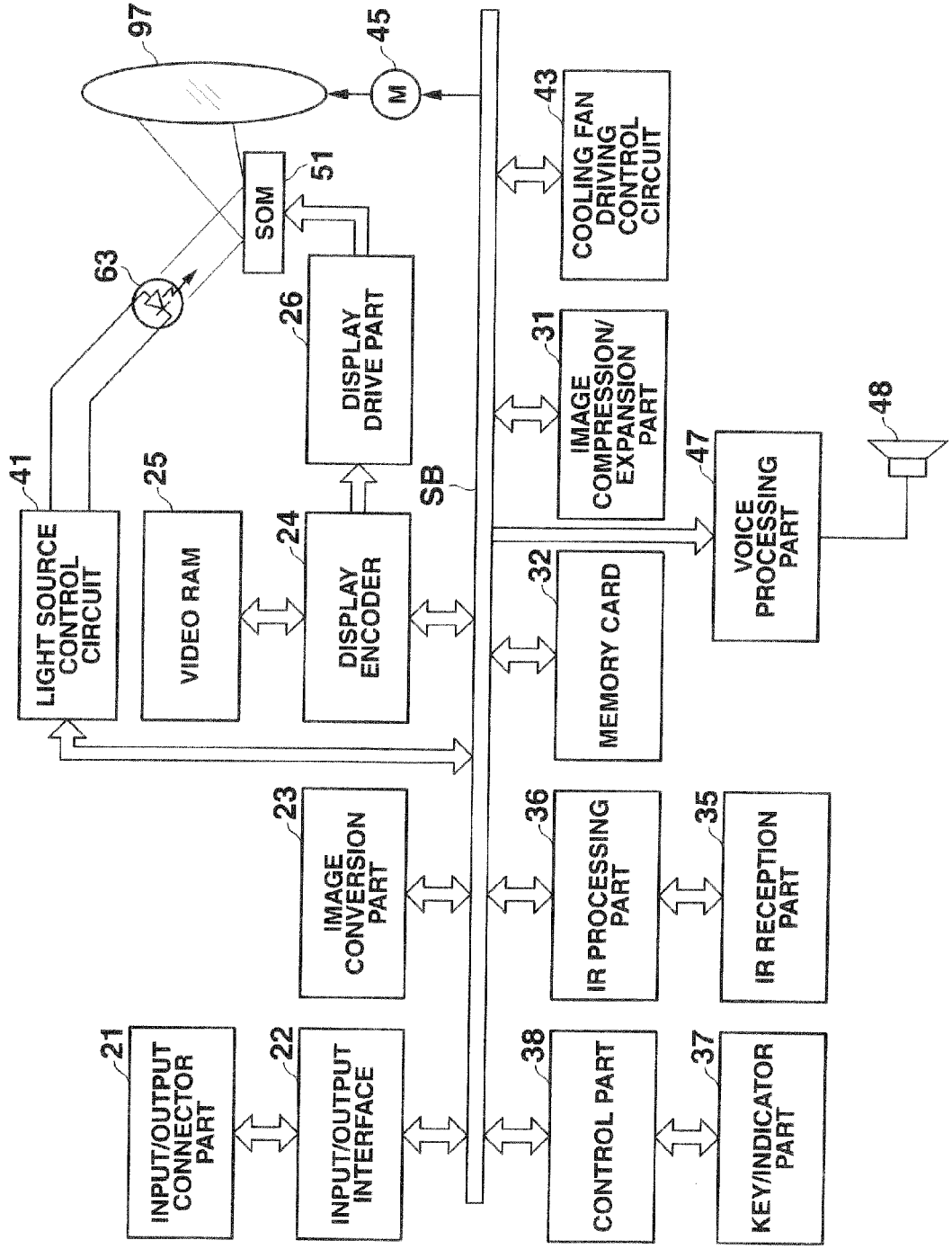
FIG. 2 is a diagram showing a functional circuit block of the projector according to the embodiment of the invention.

Additionally, as is shown in FIG. 2, the projector control unit of the projector 10 has a control part 38, an input/output interface 22, an image transforming part 23, a display encoder 24, and a display driving part 26. Then, image signals of various standards which are inputted from the input/output connector part 21 are sent to the image transforming part 23 via the input/output interface 22 and a system bus (SB) where the image signals are converted into a unified image signal in a predetermined format which is appropriate for display and the unified image signal so converted is then sent to the display encoder 24.

In addition, the display encoder 24 deploys the image signal sent thereto in a video RAM 25 for storage therein and thereafter creates a video signal from the contents stored in the video RAM 25 for output to the display driving part 26.

Then, the display driving part 26, into which video signals are inputted from the display encoder 24, drives the display device 51 which is a spatial optical modulator (SOM) at an appropriate frame rate in response to image signals sent thereto. This display device 51 is controlled to be driven by the display driving part 26. In this projector 10, when a pencil of light emitted from the light source unit 63 is incident on the display device 51 via a light source side optical system, a light image is formed by light reflected from the display device 51, and the image so formed is then projected on to a screen, not shown, for display thereon via a projection system lens group which constitutes the projection side optical system. In this projection side optical system, the driving of a movable lens group 97 is implemented by a lens motor 45 to thereby enable zooming and focusing.

In addition, an image compression and expansion part 31 implements a recording operation in which a luminance signal and a color difference signal in the image signal are subjected to data compression by ADCT (adaptive discrete cosine transformation) and Huffman coding operations so as to be written sequentially into a memory card 32 which configures a detachable recording medium. In addition, when in a reproduction mode, the image compression and expansion part 31 reads out image data recorded in the memory card 32 so as to expand individual image data which configure a series of moving pictures frame by frame, and by the image data so expanded frame by frame being then sent to the display encoder 24 via the image transforming part 23, the projector 10 enables the display of moving pictures based on the image data stored in the memory card 32.

Then, the control part 38 governs the control of operations of respective circuits within the projector 10 and is made up of a CPU, a ROM which stores fixedly operation programs such as various types of settings and a RAM which is used as a work memory.

In addition, an operation signal of the key/indicator part 37 which includes main keys and indicators which are provided on the upper panel 11 of the body casing is sent directly to the control part 38, while a key operation signal from the remote controller is received by the Ir reception part 35, and a code signal demodulated in an Ir processing part 36 is sent to the control part 38.

It should be noted that a sound processing part 47 is connected to the control part 38 via the system bus (SB). In a projection mode and a reproduction mode, the sound processing part 47 includes a sound source circuit such as a POM sound source and can convert sound data into analog signals so as to radiate sound loudly via a speaker 48 which is driven for this purpose.

In addition, the control part 38 controls a light source control circuit 41 in such a manner that a red light source, a green light source and a blue light source are time-sharing controlled in response to an image signal sent thereto. Further, the control part 38 also controls a cooling fan drive control circuit 43, and this cooling fan drive control circuit 43 causes a plurality of temperature sensors provided on the light source unit 63 and the like to detect temperatures in locations where they are provided for control of the rotational speed of a cooling fan. In addition, the cooling fan drive control circuit 43 is also made to cause the cooling fan to continue rotating by the use of a timer even after the power supply to the projector main body has been turned off. Further, the cooling fan drive control circuit 43 is made to implement a control in which the power supply to the projector main body is turned off depending upon the results of temperature detections by the temperature sensors.

Figure 3:
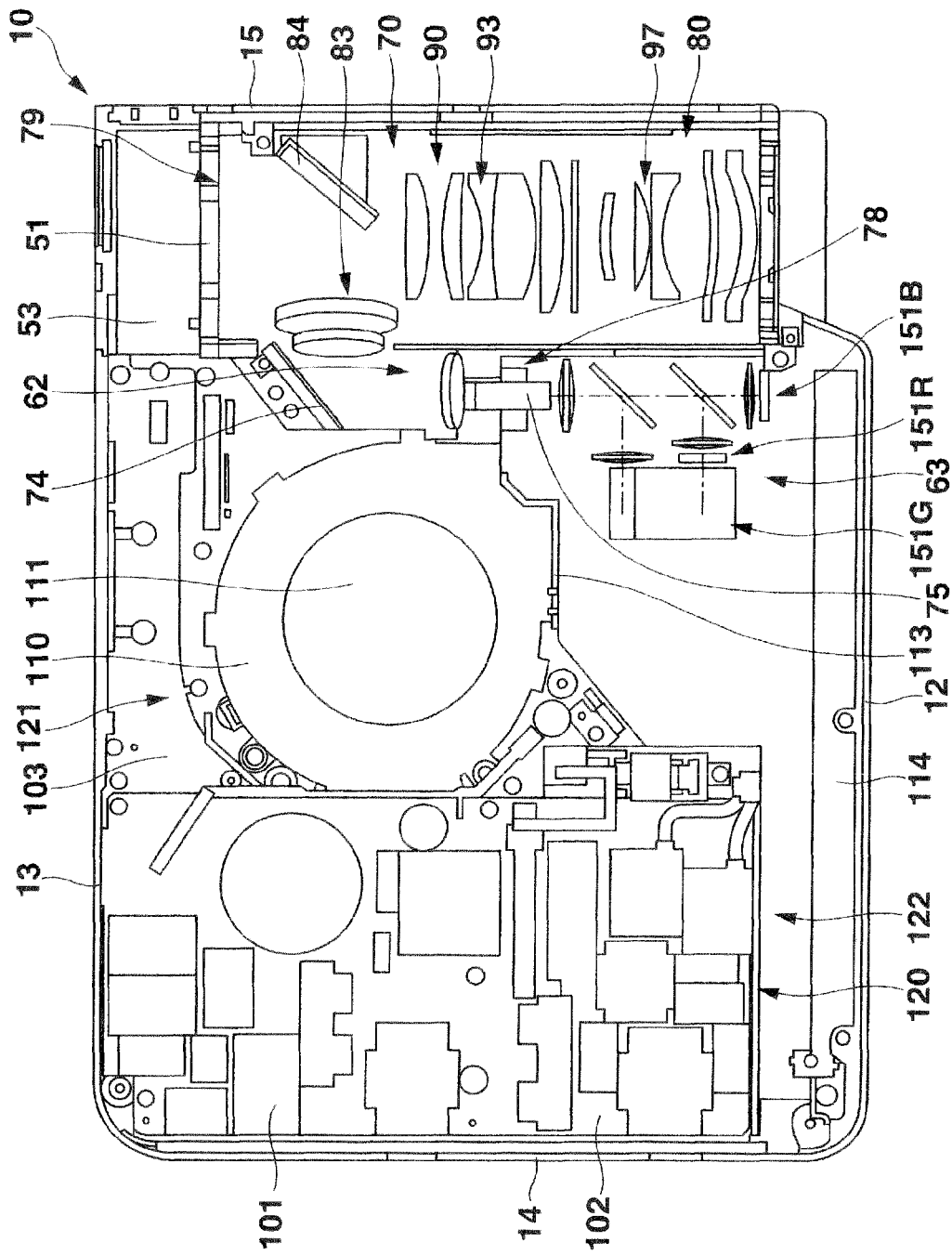
FIG. 3 is a top view of the projector according to the embodiment of the invention with an upper panel removed.

In addition, these ROM, RAM, ICs and circuit devices are incorporated in a control circuit board 103 which functions as a main control circuit board shown in FIG. 3 and a power supply circuit block 101, and the control circuit board 103 which configures the main control circuit board for a control system and a light source control circuit board 102 to which the power supply circuit block 101 for a power system is attached are formed separately.

As is shown in FIG. 3, in an interior construction of the projector 10, the light source control circuit board 102 to which the power supply circuit block 101 is attached is disposed in the vicinity of the right-hand panel 14, and an interior of the body housing is partitioned airtightly into an air inlet side space compartment 121 which lies on the back panel 13 side and an air outlet side space compartment 122 which lies on the front panel 12 side by a partition bulkhead 120. In addition, a sirocco fan type blower 110 which functions as the cooling fan is disposed in such a manner that an inlet port 111 is positioned in the air inlet side space compartment 121 and an outlet port 113 is positioned on a boundary between the air outlet side space compartment 122 and the air inlet side space compartment 121.

Additionally, disposed within the air outlet side space compartment 122 are the light source unit 63, a light guiding or smoothing unit 75 which is included in an illumination side block 78 of an optical system unit 70 for guiding light emitted from the light source unit 63 to the display device 51 while smoothing it and an outlet air temperature reduction device 114.

Figure 4:
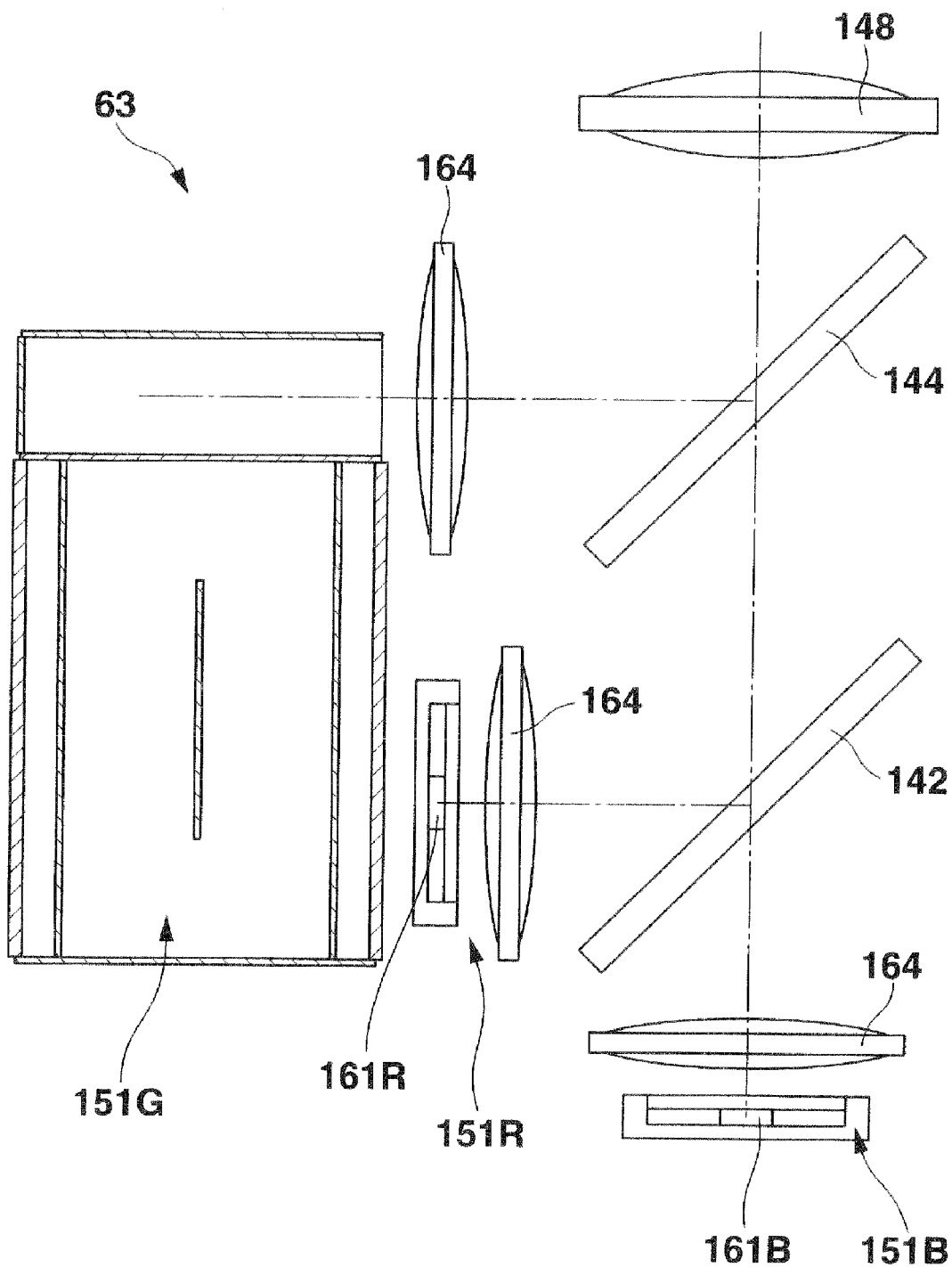
FIG. 4 is a sectional view of a light source unit according to the embodiment of the invention.

As is shown in FIG. 4, this light source unit 63 includes a red light source device 151R as a specific wavelength band light generation device for generating light of a specific wavelength band which falls in a red light range, a green light source device 151G as a specific wavelength band light generation device for generating light of a specific wavelength band which falls in a green light range and a blue light source device 151B as a specific wavelength band light generation device for generating light of a specific wavelength band which falls in a blue light range. The red light source device 151R is disposed in the vicinity of the front panel 12 shown in FIG. 3 in such a manner that its optical axis becomes substantially parallel to the front panel 12. The green light source device 151G is disposed closer to the back panel 13 than the red light source device 151R in such a manner as that its optical axis becomes parallel to that of the red light source device 151R. The blue light source device 151B is disposed in the vicinity of the red light source device 151R and the front panel 12 in such a manner that the optical axis of the red light source device 151R and an optical axis of the blue light source device 151B intersect each other at right angles.

In addition, in addition to the three specific wavelength band light generation devices 151R, 151G, 151B, the light source unit 63 includes a first dichroic mirror 142 which is disposed in a position where the optical axes of the red light source device 151R and the blue light source device 151B intersect each other, a second dichroic mirror 144 which is disposed in a position where the optical axes of red light which has bee reflected by the first dichroic mirror 142 and blue light which has passed through the first dichroic mirror 142 intersect an optical axis of the green light source device 151G, and a condensing lens 148 which is disposed on an optical axis of a pencil of light into which the red light and blue light which have passed through the second dichroic mirror 144 and the green light which has been reflected by the second dichroic mirror 144 are combined.

This first dichroic mirror 142 transmits blue light emitted from the blue light source device 151B and reflects red light emitted from the red light source device 151R in such a manner that the optical axis direction of red light coincides with the optical axis direction of blue light emitted from the blue light source device 151B. On the other hand, the second dichroic mirror 144 transmits the red light which has been reflected by the first dichroic mirror 142 and the blue light which has passed through the first dichroic mirror 142 and reflects green light emitted from the green light source device 151G in such a manner that the optical axis direction of green light coincides with the optical axis directions of the red light and blue light. The condensing lens 148 concentrates the red light, green light and blue light on to the incident surface of the light smoothing unit 75 shown in FIG. 3.

In addition, the red light source device 151R, which is the specific wavelength band light generation device, includes a required number of red light emitting diodes 161R which configure a light source which is time-sharing controlled by the projector control unit, a light source holding jig which holds the red light emitting diodes 161R, a transparent cover member which is disposed in the vicinity of the front of the red light emitting diodes 161R and a condensing lens 164 which concentrates light emitted from the red light emitting diodes 161R.

This light source holding jig is made up of a back side and an edge portion which rises from an outer circumferential edge of the back side, and the red light emitting diodes 161R are disposed in the vicinity of a center of the back side. In addition, the cover member is a rectangular board which is formed of a transparent glass or resin and is disposed in the vicinity of a front end of an edge portion of the light source holding jig, so as to seal the front of the red light emitting diodes 161R.

In addition, light emitted from the red light emitting diodes 161R passes through the cover member and is concentrated by the condensing lens 164 so as to be shone on to the first dichroic mirror 142. Then, the light is reflected by the first dichroic mirror 142, thereafter passes through the second dichroic mirror 144, and is concentrated on to the incident surface of the light smoothing unit 75 shown in FIG. 3 by the condensing lens 148.

Additionally, the blue light source device 151B, which is the specific wavelength band light generation device, has the same configuration as that of the red light source device 151R and employs as a light source a required number of blue light emitting diodes 161B which are time-sharing controlled in place of the light emitting diodes 161R. Light emitted from the blue light emitting diodes 161B passes through a cover member, is concentrated by a condensing lens 164 and is shone on to the first dichroic mirror 142. Then, the light so shone passes through the first dichroic mirror 142, thereafter passes through the second dichroic mirror 144, and is concentrated on to the incident surface of the light smoothing unit 75 shown in FIG. 3 by the condensing lens 148.

Figure 5:
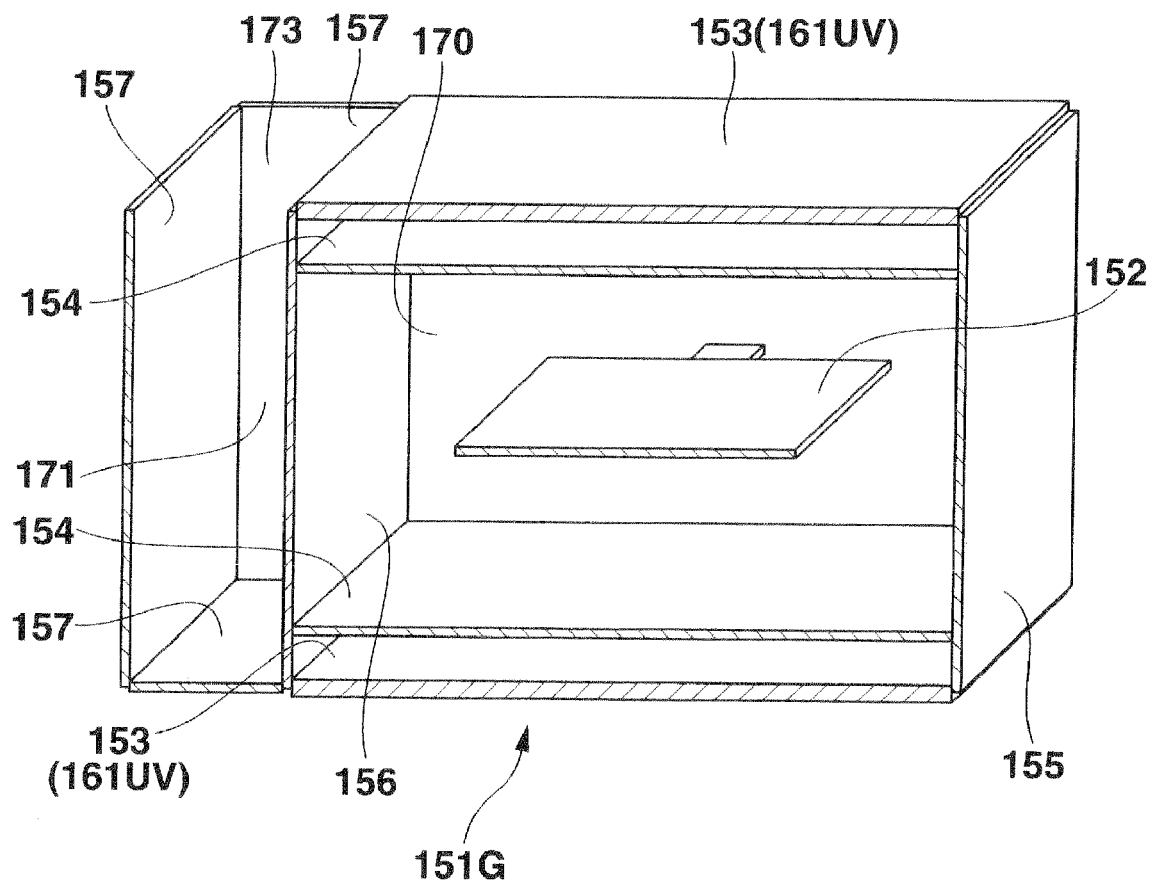
FIG. 5 is a perspective sectional view of a green light source device according to the embodiment of the invention.

In addition, as is shown in FIG. 5, the green light source device 151G, which is the specific wavelength band light generation device which is the specific wavelength band light generation device according to the embodiment which emits green light, includes a rectangular flat board-like luminescent light source 152 which receives excitation light to emit green light, excitation light sources 153 which function as surface illuminants which shine excitation light on to both front and rear surfaces of the luminescent light source 152, a reflection space 170 having a rectangular parallelepiped shape which guides light emitted from the excitation light sources 153 to the luminescent light source 152 and emits green light emitted from the luminescent light source 152 from a predetermined side thereof towards an emission space 171, which will be described later, and the emission space 171 having a rectangular parallelepiped shape which emits the green light emitted from the reflection space 170 to the outside from an emission port 173 whose area is made smaller than the area of the luminescent light source 152.

This excitation light source 153 forms a rectangular flat board-like surface illuminant which includes ultraviolet light emitting diodes 161UV, and the two excitation light sources 153 are disposed in such a manner as to face each other, forming two predetermined facing sides of a reflection compartment, which will be described later, forming the reflection space 170 having the rectangular parallelepiped shape. As this flat board-like excitation light source 153, a plurality of ultraviolet light emitting diodes 161UV are provided in parallel so as to be formed into the flat board-like shape, or a flat board-like ultraviolet light emitting diode 161UV may be used.

In addition, the luminescent light source 152 is a flat board-like phosphor which absorbs excitation light which is ultraviolet light emitted from the excitation light source 153 so as to emit green light and is disposed in an intermediate position between the two excitation light sources 153 in such a manner as to become parallel to the excitation light sources 153. The luminescent light source 152 is fixed at outer edges thereof to reflection mirrors 155, which will be described later, via transparent support members.

Additionally, the reflection space 170 is formed by a hollow rectangular parallelepiped reflection compartment which is surrounded by planes including two sides which are made up of the two excitation light sources 153, sides which are made up of the reflection mirrors 155 which reflect excitation light which is referred to as ultraviolet ray or light and luminescent light source light which is referred to as green light and a side which is made up of an emission dichroic mirror 156 which reflects ultraviolet light which is light emitted from the excitation light sources 153 but transmits green light which is light emitted from the luminescent light source 152.

The reflection compartment, which forms the reflection space 170, is formed by the two excitation light sources 153 which are disposed parallel to face each other in such a state that the two excitation light sources 153 are spaced a predetermined distance apart from each other, the three reflection mirrors 155 which are connected together in such a manner as to be brought into contact with three sides of each of the two excitation light sources 153 and the emission dichroic mirror 156 which is disposed at aside of the reflection compartment which is brought into contact with the remaining side of each of the two excitation light sources 153. In addition, the luminescent light source 152 is fixed in the vicinity of a center of the two facing reflection mirrors 155. Further, a reflection dichroic mirror 154 is disposed between the excitation light source 153 and the luminescent light source 152, and this reflection dichroic mirror 154 transmits light emitted from the excitation light source 153 but reflects light emitted from the luminescent light source 152.

In addition, the emission space 171 is formed by a hollow rectangular parallelepiped emission compartment which is surrounded by planes including a side which is made up of the emission dichroic mirror 156, sides which are made up of reflection mirrors 157 which reflect luminescent light source light which is referred to as green light and an opening which is referred to as the emission port 173. Additionally, the opening which is referred to as the emission port 173 has an area which is made smaller than the area of the luminescent light source 152 and is disposed parallel to luminescent surfaces of the luminescent light source 152. In addition, as is shown in FIG. 4, a condensing lens 164 is disposed in the vicinity of the emission port 173.

Figure 6:
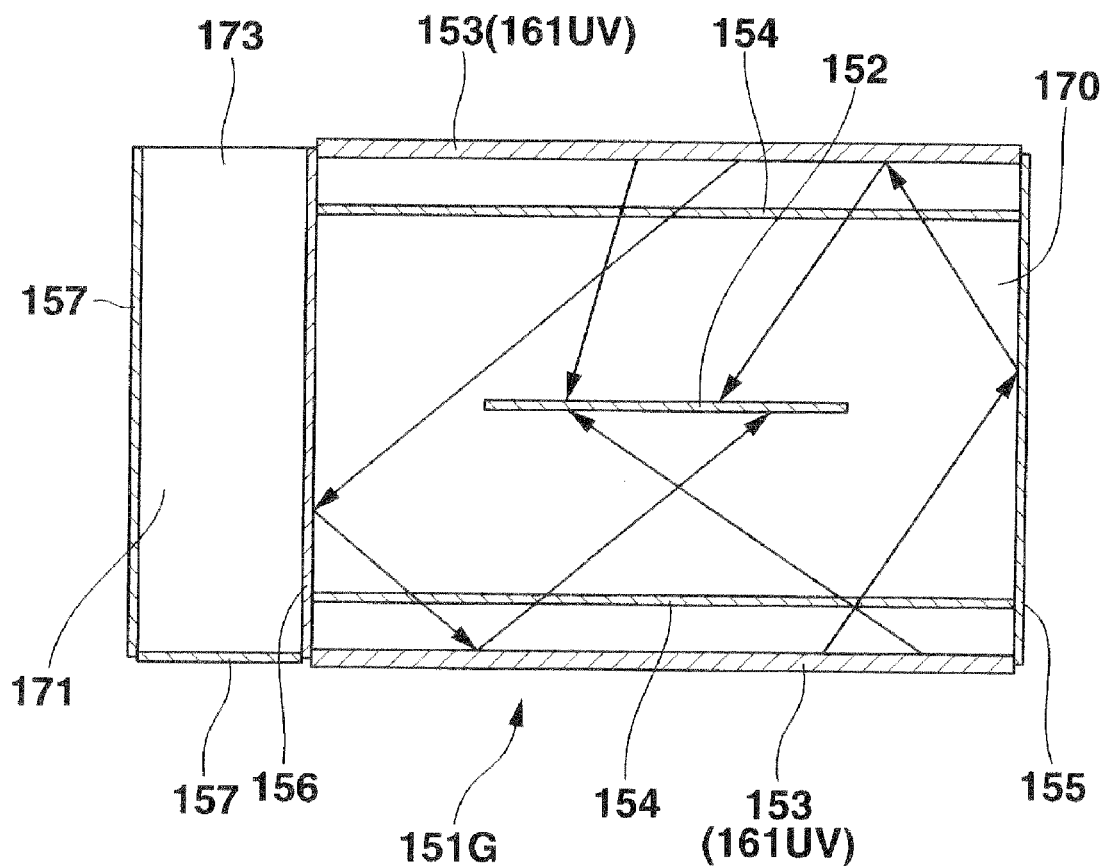
FIG. 6 is a diagram depicting flows of light emitted from excitation light sources in the green light source device according to the embodiment of the invention.

Additionally, in the green light source device 151G in this embodiment, as is shown in FIG. 6, ultraviolet ray or light emitted from the excitation light sources 153 into the reflection space 170 passes through the reflection dichroic mirror 154 and is then shone directly or after repeated reflections on the reflection mirrors 155 and the emission dichroic mirror 156 on to the luminescent light source 152. In addition, since the excitation light sources 153, that is, the light emitting diodes also have the property of reflecting light, light which is not incident on the luminescent light source 152 but is shone again on to the excitation light sources 153 is reflected on the excitation light sources 153 to thereby emitted again into the reflection space 170.

Figure 7:
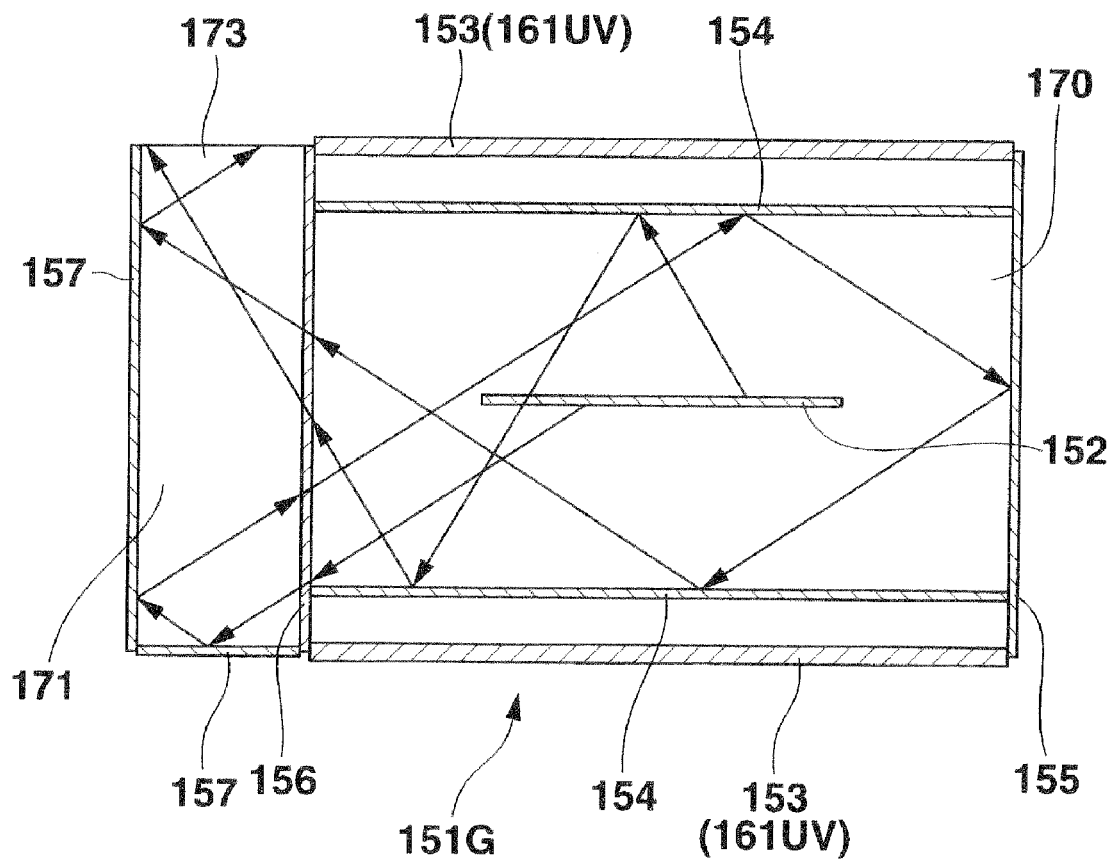
FIG. 7 is a diagram depicting flows of light emitted from a luminescent light source in the green light source device according to the embodiment of the invention.

In addition, when excitation light, which is ultraviolet light, is shone thereon, the luminescent light source 152 absorbs the ultraviolet light as excitation energy and becomes luminescent to emit green light. Then, green luminescent light source light, which is emitted by the luminescent light source 152 being caused to become luminescent, transmits the emission dichroic mirror 156 directly or after repeated reflections on the reflection mirrors 155 and the reflection dichroic mirrors 154 and is then allowed to enter the emission space 171, as is shown in FIG. 7. The green luminescent light source light that has so entered the emission space 171 is emitted to the outside from the emission port 173 directly or by being reflected by the reflection mirrors 157. In addition, a pencil of light which is reflected by the reflection mirrors 157 to thereby be shone on to the emission dichroic mirror 156 is allowed to enter the reflection space 170 again and is allowed to enter the emission space 171 again after repeated reflections within the reflection space 170, so as to be emitted to the outside from the emission port 173.

Further, the pencil of light that has been emitted to the outside from the emission port 173 of the emission space 171 is concentrated by the condensing lens 164 which is disposed in the vicinity of the emission port 173 of the emission space 171 as shown in FIG. 4 so as to be shone on to the second dichroic mirror 144. Then, the pencil of light is reflected by the second dichroic mirror 144 in such a manner that the optical axis direction thereof is changed so as to coincide with the optical axis directions of red and blue light beams, and a pencil of light which results from the combination of the green, red and blue light beams is then concentrated on to the incident surface of the light smoothing unit 75 shown in FIG. 3 by the condensing lens 148.

In addition, as is shown in FIG. 3, the optical system unit 70 is made up of three blocks including the shining side block 78 situated in the vicinity of the light source unit 63, an image generation block 79 and a projection side block 80 and is disposed along the left-hand panel 15.

The shining side block 78 includes part of a light source side optical system 62 which guides light emitted from the light source unit 63 to the display device 51 included in the image generation block 79. The light source side optical system 62 possessed by the shining side block 78 includes the light smoothing unit 75 which makes a pencil of light emitted from the light source unit 63 into a light beam of a uniform intensity distribution and the condensing lens which concentrates light that has passed through the light smoothing unit 75.

In addition, the image generation block 79 has, as the light source side optical system 62, an optical axis changing mirror 74 which changes the direction of light emitted from the light smoothing unit 75, a light source side lens group 83 which is formed by a plurality of lenses for concentrating light reflected by the optical axis changing mirror 74 to the display device 51 and a shining mirror 84 for shining light that has passed through the light source side lens group 83 on to the display device 51 at a predetermined angle. Further, the image generation block 79 includes a DMD (Digital Micromirror Device) which is referred to as the display device 51. In addition, a display device cooling device 53 for cooling the display device 51 is disposed on a back panel 13 side of the display device 51, so as to prevent the display device 51 from being heated to high temperatures.

Furthermore, the projection side block 80 has a projection side optical system 90 which has a group of lenses for projecting light which is reflected by the display device 51 to thereby form an image on to a screen, and a variable focus lens is used as the projection side optical system 90 which variable focus lens has a zooming function which is realized by including a fixed lens group 93 which is incorporated in a fixed lens barrel and a movable lens group 97 which is incorporated in a movable lens barrel, whereby the movable lens group 97 is moved by a lens motor to enable zooming and focusing.

Next, advantages of the embodiment will be described. In the optical system in the projector 10, a spatial expanse in which beams of light which can be handled effectively exist can be expressed as a product of area and solid angle, and this product is referred to as Etendue. This Etendue is a value preserved in the optical system.

In the projector 10 which employs the display device 51 such as the DMD described above, assuming that the area of an illuminated region of the display device 51 is S' and the solid angle of incident light which can be taken in by the area S' of the illuminated region is $\Omega'$, the Etendue of the display device 51 is expressed by S'×$\Omega'$. In addition, assuming that the area of a light emitting region of the light source unit 63 is S and the solid angle of emitted light is $\Omega$, the Etendue of the light source unit 63 is expressed by S×$\Omega$.

Since Etendue is the value preserved in the optical system, in the event that the value of the Etendue of the light source unit 63 which is expressed by S×$\Omega$ is smaller than the value of the Etendue of the display device 51 which is expressed by S'×$\Omega'$, all the light emitted from the light source unit 63 can be used, and hence, all the emitted light becomes effective light. However, in the event that the value of the Etendue of the light source unit 63 which is expressed by S×$\Omega$ is larger than the value of the Etendue of the display device 51 which is expressed by S'×$\Omega'$, there occurs a situation in which some of the light emitted form the light source unit 63 cannot be used.

Consequently, in a case where a plurality of light emitting diodes are used to compensate for insufficiency in quantity of light emitted from a light emitting diode, since the light emitting area is widened, the value of Etendue of the light source unit 63 is increased, and this results in the fact that the quantity of unusable light of a pencil of light emitted from the light emitting diodes is increased, leading to the problem that the utilization efficiency of light emitting diodes is reduced.

In addition, in a case where the light emitting diodes are used in a projector 10 as a light source, since the quantity of light emitted from a green light emitting diode is smaller than quantities of light emitted from red and blue light emitting diodes, there has been the necessity of increasing the number of green light emitting diodes so as to be larger than the numbers of red and blue light emitting diodes with a view to increasing the quantity of green light. However, in the event that the amount of light emitting diodes is increased simply, since the value of Etendue is also increased as has been described above, the utilization efficiency of the light emitting diodes which are so increased in number or amount is reduced, leading to the problem that after all, the issue of insufficient quantity of light which is inherent in green light remains unsolved.

In this embodiment, however, by the green light source device 151G being made into the green light source device 151G which includes the rectangular flat board-like luminescent light source 152 and the excitation light sources 153 which is made into the surface illuminants and the reflection space 170 being formed in such a manner that light emitted from the excitation light sources 153 is shone from both the front and rear surfaces of the luminescent light source 152, the utilization efficiency of light emitted from the excitation light sources 153 can be enhanced, so as to compensate for the insufficient quantity of green light.

In addition, by the area of the emission port 173 through which the luminescent light source light is emitted to the outside from the emission space 171 being formed smaller than the area of the luminescent light source 152, although the area of the luminescent light source 152 is the area of the luminescent surface in reality, the area of the emission port 173 becomes apparently the area of the luminescent surface, so that the density of a pencil of light that is so emitted can be enhanced.

Further, by the reflection space 170 and the emission space 171 being formed into the rectangular parallelepiped shapes, the luminescent surfaces of the luminescent light source 152 being formed parallel to the emission port 173 and the emission port 173 of the emission space 171 being formed parallel to the luminescent light source 152, since the luminescent light source light emitted from the luminescent light source 152 can be emitted from the emission port 173 while the angle distribution thereof is being maintained, the Etendue of light emitted from the luminescent light source 152 is made small so that the utilization efficiency of light emitted therefrom can be enhanced.

In addition, by the two excitation light sources 153, which are made into the surface illuminants, being disposed parallel to face each other and the luminescent light source 152 being disposed in the intermediate position between the excitation light sources 153 which are disposed to face each other in such a manner as to become parallel to the excitation light sources 153, light emitted in a surface-like fashion from the light emitting surfaces 153 is made to be shone in a surface-like fashion from both the front and rear surfaces of the flat board-like luminescent light source 152, and since this enables excitation light to be shone on to the whole planes of the luminescent light source 152 with good efficiency, the uniform luminescence from the whole planes of the luminescent light source 152 can be attained.

In addition, by the reflection dichroic mirror 154 which transmits light emitted from the excitation light sources 153 but reflects light emitted from the luminescent light source 152 being disposed between the excitation light source 153 and the luminescent light source 152, the attenuation of light that would otherwise occur due to light emitted from the luminescent light source 152 being shone on to the excitation light sources 153 can be prevented, thereby making it possible to enhance the utilization efficiency of a pencil of light emitted from the luminescent light source 152.

Additionally, in a case where the surface illuminant which is referred to as the excitation light source 153 is formed by disposing a plurality of light emitting diodes on a flat surface, the quantity of light can easily be increased by increasing the number of light emitting diodes, and the surface illuminant can be manufactured inexpensively. In addition, in a case where a flat board-like light emitting diode is used as the surface illuminant which is referred to as the excitation light source 153, since the light emitting diode can be disposed as a surface of the reflection compartment with no work given thereto, the light source device which is referred to as the specific wavelength band light generation device of the embodiment can easily be manufactured.

In addition, by employing the light source device which is referred to as the specific wavelength band light generation device which includes in the way described above the flat board-like luminescent light source 152 and the excitation light sources 153 which are the surface illuminants in such a manner that light emitted from the excitation light sources 153 is made to be shone from both the front and rear surface of the luminescent light source 152 so that a large quantity of light of a predetermined wavelength band can be generated, the projector 10 can be provided which can project a highly bright and clear image on to a screen.

While in the embodiment, the excitation light sources 153 which are the surface illuminants are used on the two sides of the reflection compartment, the excitation light source 153 can also be applied to the other sides thereof so as to realize a further increase in quantity of light. In addition, while the ultraviolet light emitting diodes 161UV are used as the excitation light source 153, light emitting diodes of the other colors or solid state light emitting devices such as an organic electroluminescence display can be used as the excitation light source 153.

In addition, by the use of phosphors of different colors as third light sources, not only the primary colors of light but also yellow (yellow), purple (magenta) and blue (cyan), which are the primary pigment colors can be incorporated in the light source unit 63. The shape of the luminescent light source 152, which has the board-like shape, is not limited to the rectangular shape, and hence, a circular or oval luminescent light source 152 can be used.

Further, when the luminances of the light emitting devices of the respective colors are compared relatively, by applying the light source device which is referred to as the specific wavelength band light generation device which has the first light source, the second light source and the third light source to the light source device which is referred to as the specific wavelength band light generation device which emits light of the color whose luminance is low, the luminance of the color provided by the light emitting device which emits light with a low luminance can be enhanced.

According to the invention, in the case of light emitting diodes or solid state light emitting devices being used as a light source of a light source unit, it becomes possible to provide the light source unit which can provide the high utilization efficiency of light emitting diodes or the like and hence easily increase the quantity of light and the projector which can project a highly bright projection image by employing the light source unit so provided.

While the invention has been described based on the various typical embodiments, the invention is not limited thereto. Consequently, the scope of the invention is limited only by the claims which will be described below.

What is claimed is:

1. A light source unit comprising:
   a luminescent light source which emits light of a predetermined wavelength band by receiving excitation light;
   an excitation light source which shines excitation light to the luminescent light source;
   a reflection space having the luminescent light source in an interior thereof;
   an emission space which emits the light of the luminescent light source, which is emitted from the reflection space, from an emission port having an area that is smaller than an area of the luminescent light source; and
   an emission dichroic mirror which partitions between the reflection space and the emission space and which reflects the excitation light emitted from the excitation light source but transmits the light emitted from the luminescent light source.

2. A light source unit as set forth in claim 1, wherein the excitation light source comprises a surface illuminant in which a plurality of light emitting diodes or solid state light emitting devices are arranged on a flat surface.

3. A light source unit as set forth in claim 1, wherein the excitation light source comprises a surface illuminant which employs a board-shaped light emitting diode or a board-shaped solid state light emitting device.

4. A light source unit as set forth in claim 1, wherein the light source unit comprises two of the excitation light sources, and
   wherein the two excitation light sources are disposed in parallel so as to face each other.

5. A light source unit as set forth in claim 4, wherein the luminescent light source is disposed in an intermediate position between the two excitation light sources, which are disposed to face each other, so as to be parallel to the excitation light sources.

6. A light source unit as set forth in claim 4, wherein the reflection space has a hollow rectangular parallelepiped shape which is surrounded by planes formed by:
   the two excitation light sources;
   a plurality of reflection mirrors; and
   the emission dichroic mirror.

7. A light source unit as set forth in claim 6, wherein the emission space has a hollow rectangular parallelepiped shape which is surrounded by planes formed by:
   the emission dichroic mirror;
   reflection mirrors; and
   a predetermined opening, which is the emission port.

8. A light source unit as set forth in claim 1, wherein the emission port of the emission space is parallel to the luminescent light source.

9. A light source unit as set forth in claim 5, wherein reflection dichroic mirrors which transmit the excitation light emitted from the excitation light sources but reflect the light of the predetermined wavelength band emitted from the luminescent light source are disposed between the excitation light sources and the luminescent light source.

10. A light source unit as set forth in claim 1, comprising:
    a red light source device which emits red light;
    a green light source device which emits green light; and
    a blue light source device which emits blue light,
    wherein at least one of the red light source device, the green light source device, and the blue light source device includes the excitation light source and the luminescent light source.

11. A light source unit as set forth in claim 10, wherein the green light source device includes the excitation light source and the luminescent light source.

12. A projector comprising:
    the light source unit set forth in claim 10;
    a light smoothing unit;
    a display device;
    a projection side optical system; and
    a projector control unit.

* * * * *